United States Patent [19]
Rypinski

[11] Patent Number: 5,461,627
[45] Date of Patent: Oct. 24, 1995

[54] ACCESS PROTOCOL FOR A COMMON CHANNEL WIRELESS NETWORK

[76] Inventor: Chandos A. Rypinski, 130 Stewart Dr., Tiburon, Calif. 94920

[21] Appl. No.: 813,956

[22] Filed: Dec. 24, 1991

[51] Int. Cl.$^6$ ............................. H04J 3/16; H04L 12/403
[52] U.S. Cl. ................... 370/95.2; 370/85.8; 340/825.08
[58] Field of Search ................................... 370/95.1, 85.1, 370/85.8, 85.2, 85.3, 85.4, 85.7, 94.2, 95.3, 94.1, 93, 100.1, 110.1; 379/59, 63, 56, 60; 455/33.1, 33.2, 53.1, 54.1, 54.2, 56.1; 340/825.08; 375/1

[56] References Cited

U.S. PATENT DOCUMENTS

| 4,472,802 | 9/1984 | Pin et al. | 370/95.3 |
| 4,573,207 | 2/1986 | Smith et al. | 455/54.2 |
| 4,608,685 | 8/1986 | Jain et al. | 370/85.8 |
| 4,759,016 | 7/1988 | Oksuka | 370/95.3 |
| 5,103,445 | 4/1992 | Ostlund | 370/95.2 |
| 5,111,454 | 5/1992 | Hung et al. | 370/95.3 |
| 5,276,703 | 1/1994 | Bydin et al. | 370/93 |

*Primary Examiner*—Douglas W. Olms
*Assistant Examiner*—Ajit Patel
*Attorney, Agent, or Firm*—Larry D. Johnson

[57] ABSTRACT

An access protocol and method for a common channel wireless network addresses the functions needed in large scale wireless local or premises area networks where the user stations are or may include battery-powered portable computers and telephones either fixed or moving. The function provided is setup and rapid transfer of data packets or of virtual circuits by segmental packet transmission. Microwave radio frequencies are assumed to be the primary transmission mode, however optical propagation is also a usable medium.

24 Claims, 4 Drawing Sheets

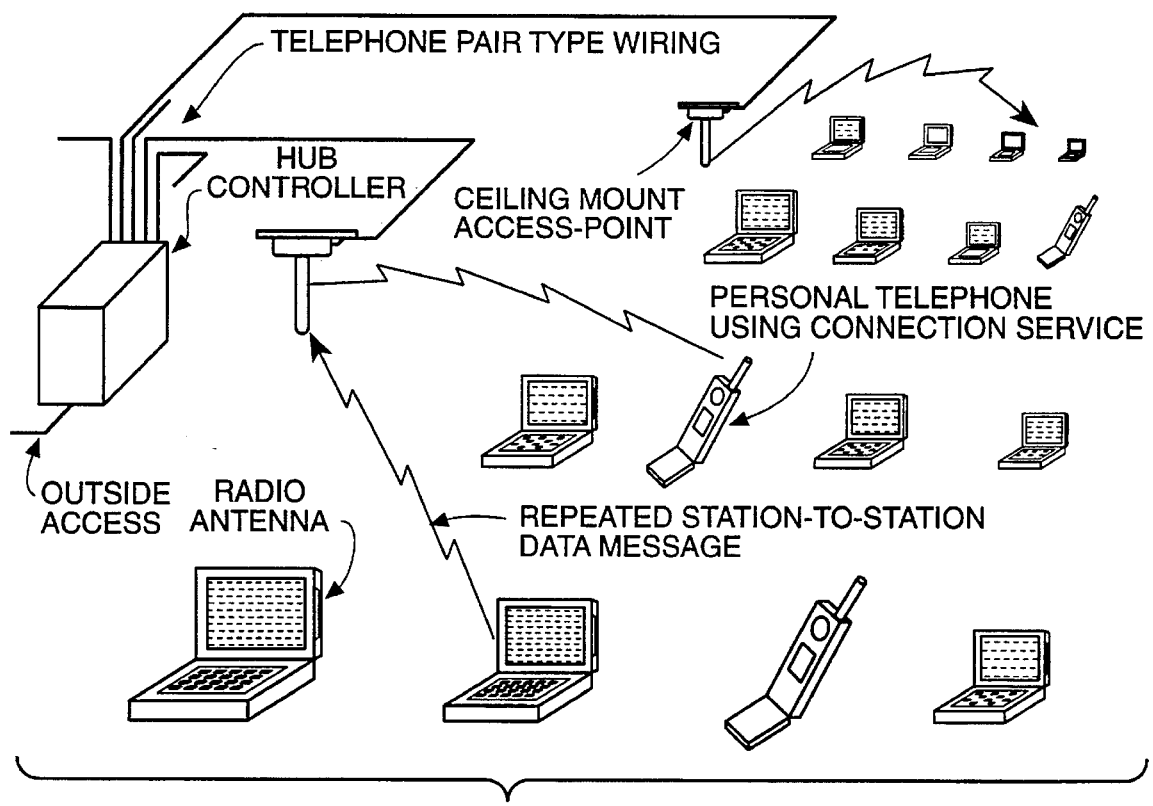
FIG._1
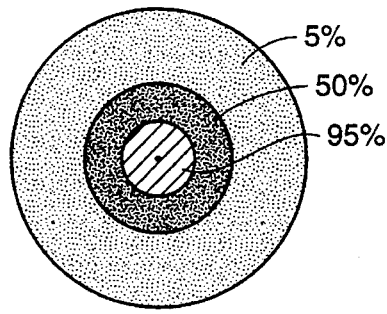
FIG._2A
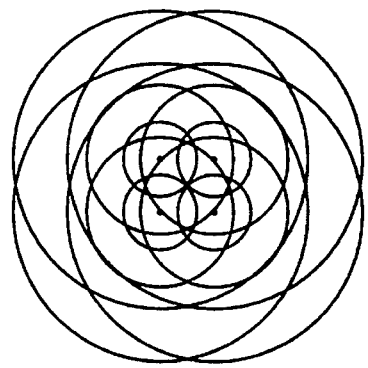
FIG._2B

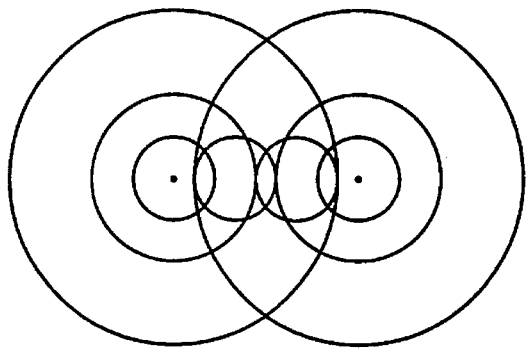
FIG._2C
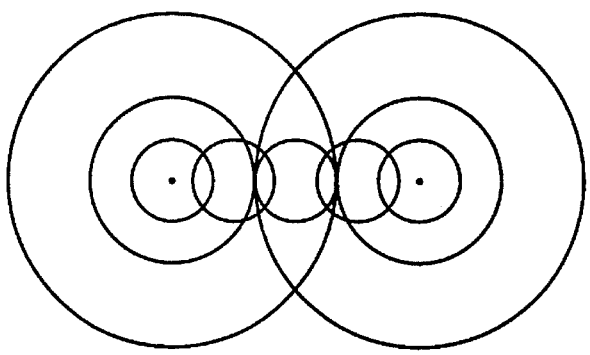
FIG._2D
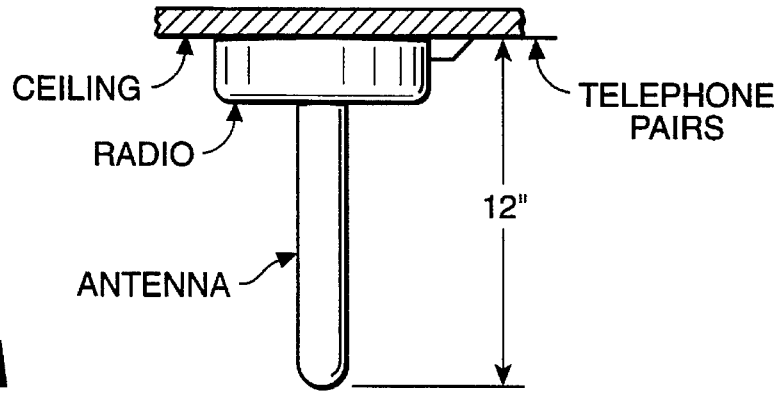
FIG._3A
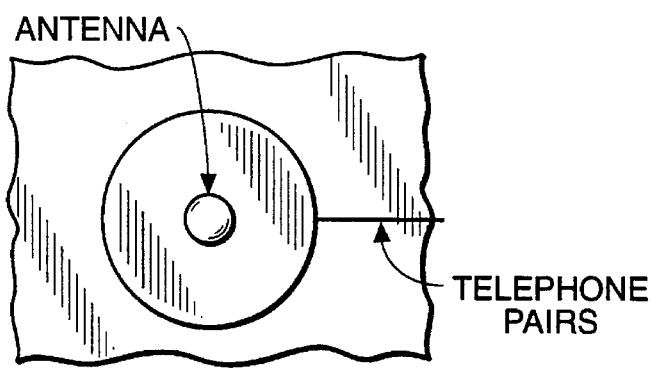
FIG._3B

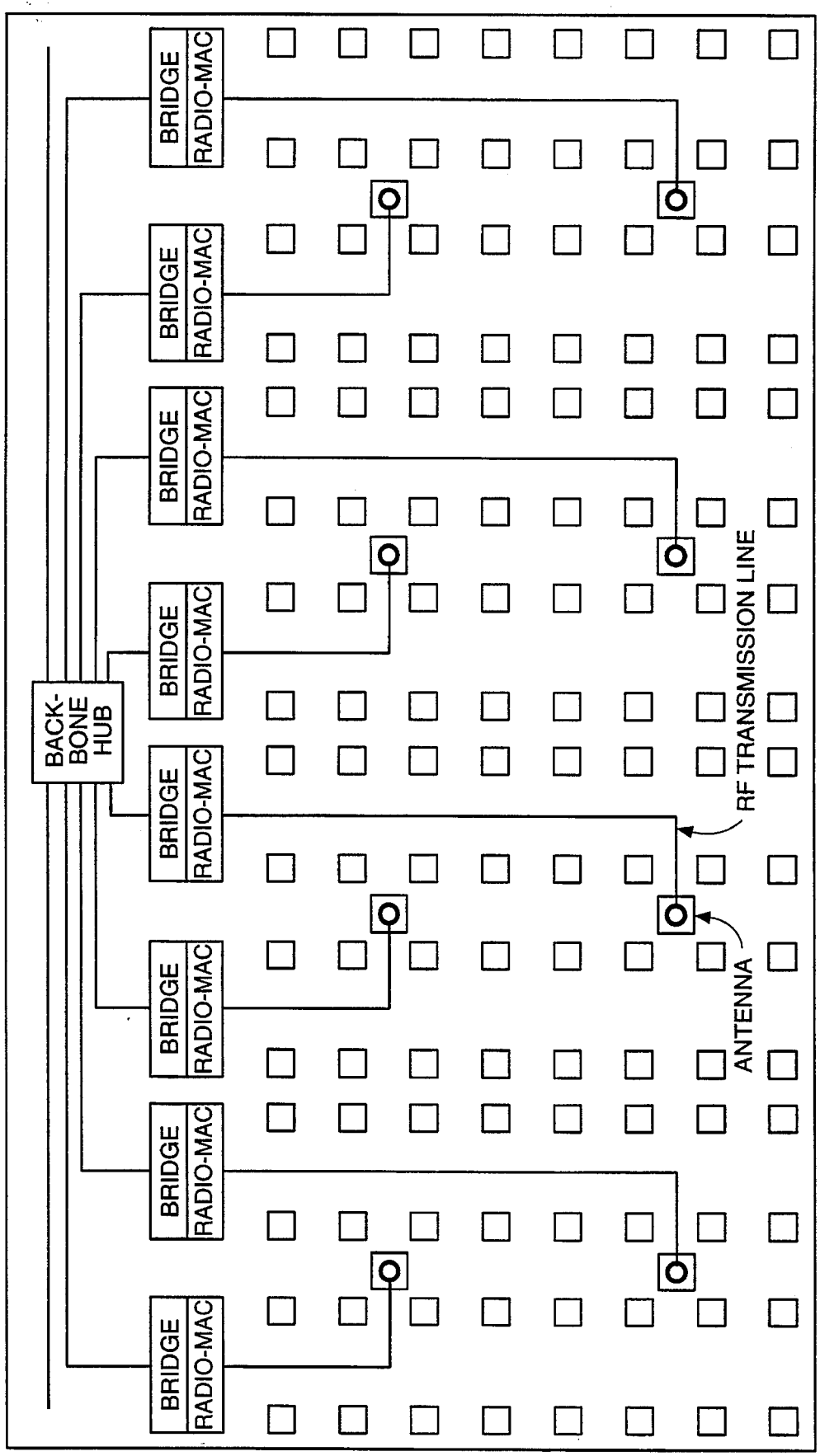
FIG._4

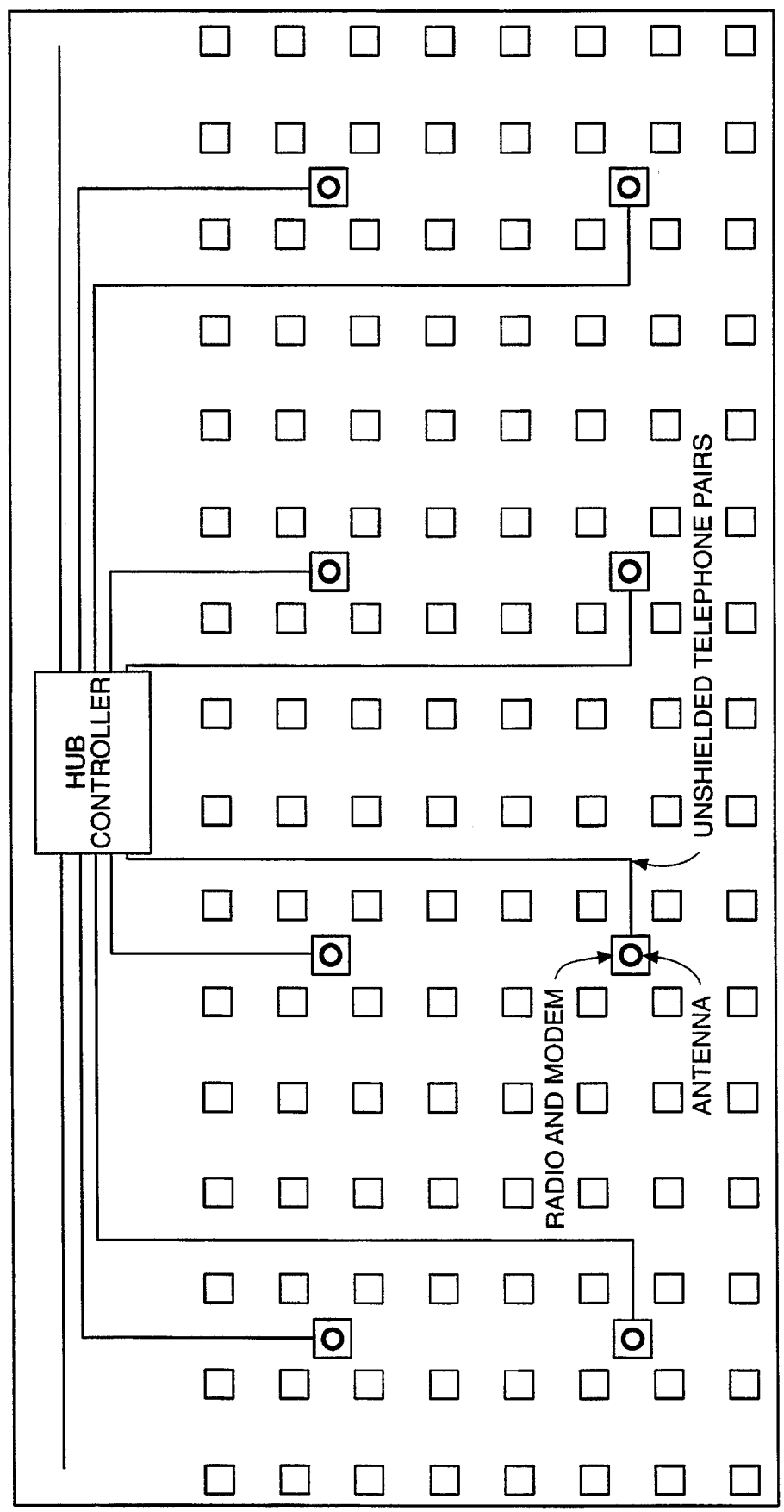
FIG._5

ACCESS PROTOCOL FOR A COMMON CHANNEL WIRELESS NETWORK

BACKGROUND OF THE INVENTION

1. Field of the Invention

This invention relates generally to communication systems and apparatus, and more specifically to an improved message-based access protocol and method for a common channel radio voice-data communication network.

2. Description of the Prior Art

Most prior art systems make the broadcast mode assumption that when one Station transmits all others hear the transmission.

The existing Standards for contained mediums absolutely assume if any Station on the medium (e.g. cable) transmits, all others are certain of receiving, and there are no extraneous signals from other sources than the Stations on the bus. This is true when all Station are taps on a common cable, but radio systems have been and are designed using an access method based on the same assumptions. Such a system is workable in isolated low-usage environments.

IEEE 802.3 CSMA/CD

"Carrier-Sensing Multiple Access/Collision Detecting"

The most widely used wired LAN access method, IEEE 802.3, assumes: 1) that if any Station transmits, the transmission can be heard by all others, and 2) if no signal is heard on the channel, then it is probable that an initiated transmission will be successful, and 3) if two Stations transmit simultaneously, the collision is detected by both Stations, both messages are lost, and after a randomized delay a further attempt can be made. The radio version of this access method has been analyzed for the case of a single Access-point, but not considering many overlapping systems (see L. Kleinrock, F. A. Tobagi; "Packet Switching in Radio Channels: Part I—Carrier Sense Multiple-Access Modes and Their Delay Characteristics," IEEE Transactions on Communications, Vol. COM-23 No. 12, Dec. 1975).

The radio medium is also a bus but now: if any Station transmits probably many of the others will hear. The others will also hear signals from other groups and networks (LANs) and spurious from transmitters in other frequency bands too.

For radio CSMA/CD, a Station ready to transmit, first listens. If the channel is quiet, the Station sends the entire packet message. There is no collision detection because the Station cannot hear it's own signal in a single frequency system.

As an alternative, an unsuccessful transmission could be detected by absence of an acknowledgment; however, the 802.3 protocol does not have immediate acknowledgement.

Fixed Width Time-Slotted Systems

It has often been found convenient to divide time into regular slots each of which can be used independently. The first result is a setup process in which sending and receiving points reach agreement that a particular slot is going to be used for a particular connection. A further consequence is that each of the slots is specified by an address which is local to the communication link. This process has served telephony well where a connection lasts minutes, but it is far to slow to be usable in local area networks where one use lasts at most milliseconds.

Many prior art systems of this type are known as "slotted Aloha" and variants in the access method have been called "Slot or packet reservation" types. All of these have been proposed for radio LAN applications.

Dedicated Access Slot with Clear Working Slots

A specific time-slotted proposal was presented to P802.11 (Local Area Network Standards Sub-committee for Wireless Medium Access and Physical Layer) described as a "Synchronous Network with Slotted Aloha Demand Assignment Multiple Access" (see J. Cheah, "A Proposed IEEE 802.11 Radio Lan Architecture," Doc: P802.11/91-07, January 1991; and "A Proposed Architecture and Access Protocol Outline for the IEEE 802.11 Radio Lan Standards—Part II," Doc: P802.11/91-54, March 1991. Contributions to IEEE P802.11).

This system employs a dedicated access (Aloha) time slot in which any Station may request service. Contention in this slot is possible, and a retry procedure is included. The destination Station is reached by a Page (Poll) in a further purpose dedicated slot. A successful Request includes acknowledgement from the destination Station, and results in the assignment of one or more slots for the "Requestor" to use upward (forward) to the Head End Controller and probably a downward (reverse) Slot on the same or different Head End Controller for the destination Station to receive. Access to a particular slot or slot group can be a reservation state in the Head End Controller.

It is not possible for a Requestor to transmit in someone else's payload slot. The availability of slots is determined by intelligence in the Head End Controller.

Packet Reservation Multiple Access

A recent published paper by Dr. David Goodman and S. X. Wei is oriented toward voice communication by short-range radio in uniform packet form (see D. J. Goodman and S. X. Wei, "Efficiency of Packet Reservation Multiple Access," IEEE Transactions on Vehicular Technology, Vol. 40 No. 12, February 91). The working of the analyzed system is summarized as follows:

"At the end of each slot, the base Station broadcasts a message that informs all terminals whether that slot will be "available" or "reserved" in the next frame. A contending terminal is one with packets to transmit and no reservation. A contending terminal transmits a packet in a time slot if: 1) the slot is "available," and 2) the terminal has permission to transmit. A binary random event generator issues permission with probability p in each time slot. Permission events are independent from terminal to terminal. The permission probability, p, is a system design parameter. In this study, p is time invariant and the same for all terminals.

When a contending terminal successfully transmits a packet in a time slot, the terminal reserves that slot for uncontested channel access in the next frame. If the transmission fails, due to a collision with a packet from another terminal, the terminal seeks permission to transmit the packet in subsequent available slots. At the end of a talk-spurt, the terminal stops transmitting and the base Station, receiving no packet in a reserved slot, informs all terminals that the slot is "available" for contention in the next frame."

The slot definition includes overhead and payload bits so that there is an access request possible in every slot one frame later. This procedure can handle short messages, and the paper considers talk spurts where the channel is relinquished and re-established at every speech pause.

It is a premise of this paper that a small probability of lost packets does not degrade the speech channel.

This method is intended for telephony where a setup delay of a one or a few frame periods is unimportant, and where very short messages (a few octets) do not exist.

Adaptive Width Time Slots

Uniform time slots are difficult fit to not random length messages. Long packets will require multiple slots which have to be scheduled. If the slot is wide enough to carry the preponderance of short packets, most will not fill the slot. Wider slots reduce the frequency of access opportunities.

One (as of this date) adaptive width time-slot proposal has been offered to IEEE P802.11: Natarajan, et al. describe a plan in which time space is divided into three types 1) contention, 2) inward and 3) outward (see K. S. Natarajan, C. C. Huang, D. F. Bantz; "Medium Acess Control Protocol for Radio Lan's," Doc: IEEE P802.11/91-74, July 1991). The use of following space and its dimensions are broadcast by an infrastructure Access-point in a broadcast transmission with information in the fields. Inward communication is initiated by request messages in the contention space. Space is allotted in the inward area for the data transfer of a particular Station. The infrastructure may transmit messages to Stations in the broadcast defined outward space.

This proposal recognizes that a fixed-width slot is inherently inefficient for the mix of very short to long packets encountered in computer communication.

So far, this proposal has not been advanced to show detail capabilities and information transferred in the broadcast slots or in Station-originated headers.

Common Limitations of Prior Art

There are many prior art time division access protocols which have been developed over the years. This protocol addresses problems arising from indistinct and continuously changing association of users with particular Access-points, and from uncertainty of continuous existence of any one transmission path. Greater size and complexity of the possible networks and minimized access delay and efficient use of channel time also require careful design of the access method.

A further assumed requirement is that no dependence is placed on information other than that obtained from the binary data stream. Prior art systems have depended on signal level or carrier present measurements in the Station equipment. An exception might be justified for the infrastructure Access-points so that they might report received signal level.

The prior art proposals do not adequately address the situation where the received signals are a composite of expected and redundant or foreign origin signals. For a common channel system, this happens because of overlap when Access-points are sufficiently closely spaced for reliable area coverage.

If the transmitting point listens to the channel before transmitting, then: the presence of signal is an inconclusive indication that the simultaneous transmission will interfere with that message and that the absence of signal indicates that there is acceptably low interference with reception at the addressed Station. The requirement at the receiving point is that the desired signal be sufficiently stronger than the interference to be usable, and this is not knowable at the transmitting point.

Once a CSMA system is large and well-loaded, the primary difficulty will be that signals are almost always present that prevent the Station with pending traffic from transmitting. The condition is well known as "busy-lockout."

One possible improvement is to channelize the system by frequency division so that interfering Stations associated with other Access-points are on different channels. This results in frequency space being divided, inflexibly, in N-ways. N could be 4, 9 or 16 in square coverage system plans. The same thing can be done with time division where Stations transmit or receive in N different slots on a medium operating N times faster in N times the bandwidth of one of the frequency-division channels. The common channel and the channelized system have about the same capacity if equal frequency space is used. One plan uses the space in parallel parts and the other uses the space in serial parts.

Many proposed systems do not know if the path from sending to receiving Station is valid before sending the packet. This can only be done with a preliminary "handshake" such as "request-grant" which is in two of the described time-slotted proposals of prior art. When contention is present and with blind transmission of complete packets, much more channel time is lost than from the unsuccessful short messages of a "handshake."

A more subtle consideration is that there must be immediate response for each step of the "handshake" without waiting for a frame time of many milliseconds to come around to the setup slot.

In a two-frequency duplex system, the transmitting Station can receive while it is transmitting and the timing of the communicating Stations are coordinated. Since there is a peer-to-peer requirement in LAN as a principal mode, LAN systems must be single frequency so two Stations can communicate without infrastructure. In this case, there may be appreciable time after one step in the handshake is received and the next step can be transmitted. This is a waiting time to be avoided in systems having a contention phase, because it creates pending states when the system is between regular states. This is a possible cause for occasional strange or "hang-up" behavior in installed systems.

SUMMARY OF THE INVENTION

The invention is an access protocol for large scale, common channel wireless local or premises area networks in which the user Stations are or may include battery-powered portable computers and telephones. A pure binary medium is used in which all functions are accomplished entirely by the coding and content of the digital bit stream.

This access method provides important features uniquely required for a large scale wireless access environment as follows:
1) Both autonomous and infrastructure dependent operation of Stations, and
2) Constructive use of redundant propagation paths due to overlapping coverage of multiple fixed Access-points that are part of an infrastructure, and
3) Structured time utilization of channels, and
4) Transmission at the highest possible data rates as limited by time dispersion (multipath propagation) in the medium, and
5) The highest possible capacity for a fixed amount of radio spectrum considering propagation time, interference effects between transmitters and bounded data transmission rate, and 6) Minimization of battery-drain at Stations, and
7) Identical processing logic in Stations regardless of size or type of system in which used.

Additional features are necessary to perform the essential functions of a connection-type (for public network access) and connectionless (for departmental computer data) communication system as now or soon to be widely used. The same services must be provided as would be expected on wired systems particularly including "bandwidth-on-demand" for connection-type (ISDN) services and compatibility with automatic routing algorithms in local area networks.

This service differs from pure personal telephone networks in many important ways one of which is: prior art pocket telephone is useless without infrastructure, but laptop computer users require direct Station—Station communication to form autonomous work groups independent of infrastructure. Such groups may form away from premises where infrastructure exists.

This invention is directly concerned with the protocol of the air-interface, however other inventions are involved to solve detail problems or to reduce the cost and complexity of the implementation.

Preferred Form of Physical Implementation

For high intensity usage and to provide external access for the served Stations, an infrastructure is used which consists of:
1) ceiling-mounted (or otherwise) Access-points containing antenna and radio, and
2) a Hub Controller common to many Acess-points, and connected to them using telephone pairs, and connected to a means of access to other data and telephone networks.

The Stations may be "lap-top" portable computers using both fast packet and connection-type services, or pocket telephones using only the ordinary voice connection-type service, or any other fixed or moving device which is better served by wireless access to these or other facilities.

Summary of Operation

The access-method defines the exact content and function of the digital information passing through the air-interface.

All information transfer uses length-limited digital messages with a payload and with a header and end-delimiter considered as overhead. Transmissions are asynchronous in that each message is initiated following the completion of a preceding and enabling message with the exception of the group of initiating messages originating from the Hub Controller.

When the infrastructure is idle, INVITATION-TO-REGISTER and INVITATION-TO-REQUEST messages are transmitted. Only after one of these messages is a Station permitted to transmit without a prior addressed enabling message.

Stations register upon turn-ON and are polled thereafter.

After an INVITATION message, registered Stations may send a REQUEST message with full information on the transfer required. The Access-point, conditioned on resource and channel availability, sends a GRANT, the Station sends a limited length packet and the Access-point ACKnowledges.

The Hub Controller through the Access-point can send a message at any time because it is there that the use of channel time is organized and scheduled.

To overcome co-channel interference between nearby Acess-points, a group of them is used sequentially. The group size for square cell plans is 4, 9 or 16. The larger groups have the least possibility of interference, and the smaller groups have the least access delay and the greatest capacity. This sequential use of Access-points is one of the main reasons for the shared Hub Controller.

It is the Hub Controller which schedules the sequential use and which divides use of channel time between connection and packet services by control and timing of the enabling messages. The length of messages is limited to enable a guarantee of worst case access delay for connection-type traffic where a delayed packet is a lost packet.

To implement operation without infrastructure, there are two possible default variants of the access method which becomes active in a Station when infrastructure is either absent or dormant: 1) Stations can handshake directly with each other, or 2) one Station emulates the essential infrastructure functions. Since this autonomous mode does not generate transmissions in the quiescent state, it is a desirable mode for off-peak operation. The possibility of automatic transition between high and low usage modes is supported.

BRIEF DESCRIPTION OF THE DRAWINGS

FIG. 1 is a pictorial plan of a complete system without scale in numbers or dimensions.

FIG. 2 shows, qualitatively, the coverage of a radio system. FIG. 2A shows that the probability of an adequate path decreases with distance. FIG. 2B shows the degree of overlap for simultaneous operation when four Access-points are sufficiently closely spaced to give continuous high-probability coverage. FIGS. 2C and 2D show overlap when every 9th or 16th Access-point is used simultaneously.

In FIG. 3, shows a possible appearance of a radio Access-point for 2.5 GHz. The size and simplicity are suitable for use in large numbers.

FIG. 4 is a diagram of a prior art radio system concept in which each Access-point contains all of the necessary logic function to enable backbone interconnection of Access-points by a standard LAN. In this case, each Access-point looks like a separate network, and Stations may not move quickly from one to another because of the response-time limitations of the routing algorithms in the bridges and external equipment.

FIG. 5 is a diagram of the network layout using the access method of the invention. The entire radio system has one interface to outside networks. The movement of a Station from the coverage of one Access-point to another is handled entirely within the Hub Controller.

DETAILED DESCRIPTION OF A PREFERRED EMBODIMENT

FIG. 1 is a pictorial plan of a complete system without scale in numbers or dimensions. The physical medium shown is microwave radio, though optical radiation could be substituted. This might be called a premises area system rather than a wide or metropolitan area system.

Stations may be either hand held telephones or battery-powered computers. Though not shown any type of data or telecom using device could be served.

A hub controller is shown with telephone twisted pair links to each access point. The signal traversing these pairs is a baseband representation of the radiated signal minimizing logic function in the access point. The hub controller is also linked to outside networks which might be the PSTN or other existing LANs and PBX telephone systems.

FIG. 2 shows, qualitatively, the coverage of a radio system. FIG. 2A shows that the probability of an adequate path decreases with distance. FIG. 2B shows the degree of overlap for simultaneous operation when four Access-points are sufficiently closely spaced to give continuous high-probability coverage. FIG. 2C and 2D show overlap when every 9th or 16th Access-point is used simultaneously. This figure addresses co-channel operation where the interference range is 4 times the service range. If it is desired to have 100% area coverage, it is widely understood that a number of independent channels are necessary used in a regular pattern. The hexagon patterns of 7 frequencies are familiar from descriptions of the cellular telephone systems. The interference is smaller the larger the number of available channels, and also the total capacity per unit area is smaller.

Within buildings intended for 100% area coverage, it is a better approximation to start with square patterns of 4, 9 or 16 smaller squares (this is the cellular reuse number) where there would have to be an independent channel for each square in the pattern.

The present invention obtains the same effect by using a faster channel a fraction of the time. For example if 64 MHz of spectrum space is available, it might be used to provide one channel of 16 Mbs or four channels of 4 Mbs. The total capacity is the same either way, however one fast channel has advantages for short-reach systems that would not apply to urban coverage systems. One fast channel used on the average of 25, 11 or 6% of the time is the method of the present invention.

FIG. 2C and 2D illustrate that the larger the pattern the lower the level of interference. In FIG. 2D for a pattern of 16, the core coverage is outside of the 5% circle. In FIG. 2C for a pattern of 9, a part of the core coverage is inside the 5% circle. In FIG. 2D for a pattern of 4, much of the core coverage is inside of the 50% circle. Without any help from walls or directive antennas it would take either nine frequencies or nine-way time sharing top get continuous area coverage.

It is not possible to totally isolate the coverage of one access point and another. At a certain point it is more economical to provide recovery mechanisms from corrupted transmissions. The faster the transmission medium, the less apparent second and third transmission attempts will be.

FIG. 3 shows a possible appearance of a radio Access-point for 2.5 GHz. The size and simplicity are suitable for use in large numbers. The function of the access point is that of a transducer to/from radiation frequency to baseband conditioned NRZ. For the short distances between access point and hub controller this baseband data rate can be 10–20 Mbits/sec or more.

FIG. 4 is a diagram of a prior art radio system concept in which each Access-point contains all of the necessary logic function to enable backbone interconnection of Access-points by a standard LAN. In this case, each Access-point looks like a separate network, and Stations may not move quickly from one to another because of the response-time limitations of the routing algorithms in the bridges and external equipment. To understand this limitation, it is necessary to understand some of the properties of ISO layering, typical network software function, 802.1 specified repeaters and bridging. In the general structure of ISO layering (as explained in "Computer Network Architectures and Protocols," P. E. Green editor (IBM Research Center), Plenum Press New York, 1982; Chapter 2, "A Standard Layer Model," H. Zimmermann, p. 49), the two lowest layers are specific to a defined medium. Layers 3 and 4 concerned with network and transport deal with internetworking and a different type of global address space.

Upper level software expects a reliability related to wire and fiber-optic transmission. If a radio system with an order or two lower reliability is used, the higher layer recovery mechanisms will may become overloaded or slow or both. In addition, there are timeout and segmentation functions that may not harmonize with a radio system.

Related networks may be linked by bridges at or below layer 2. Each bridge must keep track of which user stations are related to each of its ports. There is an automatic route finding function in these machines, but time and communication space are consumed when it is invoked.

If a station may move from the coverage of one access point to another in fractions of a second and move on to another in another fraction of a second, this type of structure will become highly exercised over changes happening too frequently. The reality of short reach radio systems is that these changes will occur frequently as objects and people stir the propagation space.

FIG. 5 is a diagram of the network layout using the access method of the invention.

Definitions for the Message-Based Access Protocol

The operation of the packet-medium, message-based access protocol for the ubiquitous premises area radio system may be better understood after some details are presented including a description of the messages and the fields within them that are used.

Requirements on the Transmission Medium

The transmission medium is required to carry a pure binary data stream sent in short bursts. Transmitters are turned ON and OFF very quickly, and receivers and demodulators are commonly required to use no more than the transmission time of one octet (8-bits) to become synchronized and stabilized. Larger acquisition time will reduce transfer efficiency for short messages.

For every radio or other medium transducer, the logical input is transmitter on-off, data and bit-clock; and the logical output is data, bit-clock and data-valid or not. These definitions are consistent with a universal interface for interconnecting medium dependent and independent equipment.

Radio modulation technique is important to the success of high-rate transmission, but the details are outside of the scope of this invention except for the presumption of an adequate method.

Example Parameters

Unless otherwise noted, examples given assume a 12 Mbits/sec throughput signaling rate in the medium, a maximum radio range of 15 meters and a propagation delay of 4 μseconds.

This access protocol would be equally suited to lower and to higher rates up to 150 Mbits/second or more.

Segmentation

This process is necessary to accommodate a limit on the maximum size of the data payload permitted in one transfer. Long datagrams are transferred by multiple, separately-accessed segment data frames. This function enables adaptation to longer packet lengths used by higher protocol levels.

Unless otherwise noted, the example maximum payload length allowed in one packet or segment is 288 octets. A 48/288 octet payload corresponds to a 64/384 Kbits/second isochronous channel sent with 6 milliseconds of samples in each packet.

Radio ON-OFF and OFF-ON Transitions

The first and last transmitted bits of each transmission are undefined except as the time space reserved for the transmitter off-on and on-off interval.

Message Definitions

As shown below, the concatenation of the DIR field and the TYP field results in a 3-digit message type number, where message types starting with 0 are transmitted by Access-points and the message types starting with 1 by Stations as follows:

| DIR+TYP No. | MESSAGE TYPE, |
|---|---|
| 000 | Management message to Access-point |
| 001 | Segment data frame--short address |
| 003 | Packet data frame--long address |
| 005 | Invitation-to-request |
| 007 | Poll or invitation-to-register |
| 009 | Ack |
| 011 | Nack-Repeat |
| 013 | Grant |
| 015 | (NOT USED) |
| 100 | Segment data frame |
| 102 | Packet data frame |
| 104 | Register |
| 106 | De-register |
| 108 | Request--short address |
| 109 | Ack (same as 009) |
| 110 | Request--long address |
| 111 | Nack (same as 011) |
| 112 | Ack |
| 113 | Grant (same as 013) |
| 114 | Nack |

The list in Table I above is complete, except that a few additional message types are formed by field variations (e.g. Poll is changed to Invitation-to-register by a null address field). Variant messages 109, 111 and 113 are used only in autonomous operation where messages defined for the Access-point are transmitted by the Stations.

A shown in Tables II and III below, the fields used are listed by acronym as defined in Table IV later.

TABLE II

MESSAGE FIELDS LIST FOR ACCESS-POINTS

| DIR+TYP No. | MESSAGE TYPES, FIELDS (with length in bits) | LENGTH OCTETS |
|---|---|---|
| 001 | SEGMENT DATA FRAME (short address) PRE (15), SD (7), DIR (1), TYP (4), CNN (4), DA (16), SGN (8) PDU (0–288 octets), CRC-16 (16), ED (7) | 10+PDU |
| 003 | PACKET DATA FRAME (long address) PRE (15), SD (7), DIR (1), TYP (4), API (4), DA (64), SA (64), SID (3), LEN (13), PWR (4), CNN (4) PDU (0–288 octets), CRC-16 (16), ED (7) | 26+PDU |

TABLE II-continued

MESSAGE FIELDS LIST FOR ACCESS-POINTS

| DIR+TYP No. | MESSAGE TYPES, FIELDS (with length in bits) | LENGTH OCTETS |
|---|---|---|
| 005 | INVITATION-TO-REQUEST PRE (15), SD (7), DIR (1), TYP (4), API (4), SYS (8), ED (7) | 6 |
| 007 | POLL or INVITATION-TO-REGISTER PRE (15), SD (7), DIR (1), TYP (4), API (4), DA (16), SYS (8), ED (7) | 8 |
| 009 | ACK PRE (15), SD (7), DIR (1), TYP (4), API (4), SYS (8), PWR (4), CNN (4), ED (7) | 7 |
| 011 | NACK-REPEAT same as 009 | 7 |
| 013 | GRANT (DA=requesting Station) PRE (15), SD (7), DIR (1), TYP (4), API (4), DA (16), PWR (4), CNN (4), ED (7) | 8 |

TABLE III

MESSAGE FIELDS LIST FOR STATIONS

| DIR+TYP No. | MESSAGE TYPES, FIELDS (with length in bits) | LENGTH OCTETS |
|---|---|---|
| 100 | SEGMENT DATA FRAME PRE (15), SD (7), DIR (1), TYP (4), CNN (4), SA (16), SGN (8), PDU (0–288 octets), CRC-16 (16), ED (7) | 10+PDU |
| 102 | PACKET DATA FRAME same as 100 | 10+PDU |
| 104 | REGISTER PRE (15), SD (7), DIR (1), TYP (4), API (4), SA (64), SYS (8), ED (7) | 14 |
| 106 | DE-REGISTER same as 104 | 14 |
| 108 | REQUEST--short address PRE (15), SD (7), DIR (1), TYP (4), CNN (4), DA (16), SA (16), SID (3), LEN (13), ED (7) | 11 |
| 110 | REQUEST--long address PRE (15), SD (7), DIR (1), TYP (4), CNN (4), DA (64), SA (64), SID (3), LEN (13), ED (7) | 23 |
| 112 | ACK PRE (15), SD (7), DIR (1), TYP (4), API (4), SA (16), SYS (8), ED (7) | 8 |
| 114 | NACK same as 112 | 8 |

These choices for field structure may be altered to include more information or to improve structural consistency for simpler processing without departing from the principles of the invention.

TABLE IV

ACRONYM DEFINITION

| ACRONYM | DEFINITION | LENGTH IN BITS |
|---|---|---|
| API = | access-point identifier | 4 |
| CNN = | connection number identifier | 4 |
| CRC = | cyclic redundancy check | 4, 8 or 16 |
| DA = | destination address | either 16 or 64 |
| DIR = | direction bit and 1st digit of message type identifier | 1 |
| ED = | end delimiter using 7-bit Barker | 7 |
| LEN = | length of PDU in octets | 13 |
| NUL = | null--no assigned meaning | |
| PDU = | packet data unit (payload) | from 0 to 288 octets |

TABLE IV-continued
ACRONYM DEFINITION

| ACRONYM | DEFINITION | LENGTH IN BITS |
| --- | --- | --- |
| PRE = | preamble | 15 |
| PWR = | power set command | 4 |
| SA = | source address | either 16 or 64 |
| SD = | start delimiter using 7-bit Barker | 7 |
| SGN = | segment counter/circuit status | 8 |
| SID = | service type identifier | 3 |
| SYS = | system identifier | 8 |
| TYP = | 2nd and 3rd digits of message type identifier | 4 |

The size of some of these fields might be increased or decreased without departing from the principles of the invention. Address fields are governed by Standards agreements and are unlikely to change, however a data only plan would require only 6 octets for a long address.

Delimiting

The first and last transmitted bits are the time space reserved for the transmitter off-on and on-off interval.

The preamble bit pattern, PRE, is chosen to expedite bit-clock acquisition at the receiver and may be dependent on details of radio modulation. For an NRZ baseband, it would be the bit values that provide continuous transitions.

The SD and ED symbols are "Barker" delimiting characters where possibly one is the invert of the other.

Address Fields

Long addresses are generally used. The short address is local and temporary, and its life span is one registration. It is used for labeling of segments of long packets and virtual circuits and for routine messages.

The long address is 8 octets even though the LAN global address is defined as only 6 octets. The added two octets in the long address are a specific accommodation of global addressing in voice-data integration.

Telecom global addressing, as defined in CCITT E.164 is 15 decimal digits coded BCD (60 bits). In the IEEE 802.6 integrated voice-data Wide Area Network standard, both of these types of addresses are enclosed in an 8 octet field with 4 bits used for differentiation and detail definition. The format for the long address in this access protocol exactly duplicates that in the referenced standard so that it may be mapped back and forth between the two mediums.

Identifiers

The source of the signal is given for the Access-point in the API field. The API is a location identifier within a pattern. It is probable that the API is the least significant bits of a longer identifier used internally by the infrastructure.

The SYS field is a further system identifier which is used when independently managed systems have overlapping radio coverage. Each system will generally ignore received transmissions that have a foreign SYS field.

The service type identifier, SID, marks Request messages for connection-type services or datagrams. It is probable that the definitions of the bits in this field can be modified to include a priority function.

The connection number identifier, CNN, is used to identify each one of multiple simultaneous connections at one Station.

Format Control

The primary means of determining the location of the end of the data payload is the length field, LEN. The length value is for the entire message, not the current segment.

Using the SGN field, a count value is included in the header of each segment transferred. This is used to assure correct order and detect lost segments.

Description of the Access Protocol

This description is for a system of one sequential access group with 4, 9 or 16 Access-points on which various INVITATION, POLL and transfer messages appear serially. The group of Access-points function as one high-rate channel used sequentially for various contiguous geographic coverages. The system is effective because the length of each transmission and the duty cycle of each user is small. The longest permitted message uses less than 210 μseconds of channel time at 1.5 octets per μsec (12 Mbits/sec).

The number of Access-points in one group used sequentially is as small as possible, but the number must be large enough so that interfering Access-points are rarely ON at the same time. The choice must consider interference from like-type contiguous systems with overlapping radio coverage.

For any size of the sequential group, the aggregate capacity is more than 4,500 messages (288 octets each) per second. This capacity is adaptively divided between the Access-points in the sequential group.

Scan time is defined as the time period required for all Access-points in one sequential group to have given its served Stations an access opportunity.

The description below is from the viewpoint of the individual user Station unless otherwise noted.

Registration Function

Stations just entering the system listen first for the INVITATION-TO-REGISTER (007) message from which they identify the system providing the infrastructure. The Station cannot know which is the strongest signal received or which site would provide it, though it can distinguish a usable from an unusable signal.

The unregistered Station upon hearing a readable INVITATION-TO-REGISTER sends a REGISTER (104) message with a long address (an 8 octet field in which the address is 6 octets for LAN and 60 bits for telephony) and hears a PACKET-DATA-FRAME (003) with long address in response. The payload of that frame contains the assignment of a temporary short address (2 octets) to that Station. If there is no response, the Station tries again at the next opportunity on a different Access-point. The Station ACKnowledges (112) the registration response with the assigned API and short address.

A refinement of the system might use a slightly reduced power level for INVITATION type messages to increase the probability that the path loss is low enough for successful data transfer if the INVITATION message can be read.

The infrastructure provides an INVITATION-TO-REGISTER (007) on each Access-point in the sequential group within a complete poll cycle. This message is identical to the POLL except for a NUL destination address field.

It is possible that some subsets of this protocol would not use the Registration function.

Polling Function

Once a Station is registered, it is periodically polled and the infrastructure knows how to reach it. The POLL message is the means used to be sure that each Station is present, active, assigned a short address and associated with the correct Access-point in the directory maintained by the System in the Hub Controller. The POLL is the means of detecting Stations that have left the system without de-registering. The POLL is used to detect changes in serving Access-point and may also be used to determine the required power level for each Station.

The infrastructure sends a POLL message (007) to every known user of the system periodically. The time used is after a selected (set by configuration) number of INVITATION-TO-REQUEST messages when there is no traffic waiting. This time makes only a slight increase or no increase at all in the minimum scan time. The transmission originates on the Access-point last used by that Station, otherwise a group of surrounding Access-points is used for a second try. The POLL messages are interspersed with other Access-point transmissions on a background level priority.

The addressed Station responds with ACK message (112), and it notes the identification (API) of the Access-point from which the POLL was received as current.

If there is a change of Access-point, then the Hub Controller will repeat the POLL on the newly selected Access-point to inform the Station of the change.

One poll requires: 26 μsec (8 oct+7 octs+7 octs+12 μsec) of air-time at 12 Mbits/sec. For 200 Stations, the polling function uses 5.2 milliseconds of the air time for a round that might be initiated as infrequently as every 15 seconds.

As a means of determining the best Access-point for each Station, only the Access-points have the capacity to measure received signal level. If the poll response of a Station is at a higher level on a different Access-point than on the currently identified Access-point, the status entry for that Station will be changed in a system directory accordingly. The Station is updated by a second POLL immediately following the first Station ACK.

An alternate means of picking the best Access-point is for each receiving Access-point to measure turn-around time on the POLL (time from end of POLL to start of ACK) telemetering the value to the Hub Controller. This refinement is a separate invention.

The POLL also informs the Station that the infrastructure knows it is there. If a Station is not polled for some configurable period of time, the Station will then re-REGISTER.

It is possible that some variants of this protocol would not use the polling function.

Access Method for Station-Originated Packets

In this system, Stations may request use of the channel only when enabled by receipt of an INVITATION-TO-REQUEST message from the Hub Controller. After a proper REQUEST, the Hub Controller transmits GRANT, and then the Station sends the PACKET DATA FRAME.

The Hub Controller will send INVITATION-TO-REQUEST messages only if the conditions necessary for immediate and successful transmission are present. The Hub Controller is responsible for knowing the interference possibilities that go with the use of each Access-point.

Many Access-points are connected to the common Hub Controller.

Quiescent Condition

After the Access-point sends an INVITATION-TO-REQUEST message, the first three octets of a REQUEST (005) must be heard to determine that a response is there or not. It is possible for INVITATION-TO-REQUEST messages to originate at a rate as high as once every 10 μsec (including propagation delay). An all-site scanning sequence through 4 or 16 Access-points takes only 40 or 160 μsec if there is no traffic.

There are two methods of sequencing the INVITATION message: 1) asynchronously or as fast as possible to obtain minimum access delay, and 2) at regular intervals so that stepping time is constant.

It could be desirable to use regular intervals to reduce quiescent mode radiated energy. Since the INVITATION message transmitter ON-time is 6 μsec, a transmission once every 250 μseconds results in an average energy level that is 2.4% of the peak value or 4% of what it would otherwise be.

The constant interval may improve operation with adjacent synchronized systems, and must be chosen so that at least enough time is allowed to pass a maximum length packet after each INVITATION-TO-REQUEST. Transmission of this message at intervals of 250 μsec (and at the completion of any data transfer) is a possibility which would lead to a scan time of 1 or 4 milliseconds for a 4 or 16 Access-point scan group.

A further refinement with a group of 16 is to allow non-periodic operation within each sub-group of four so that it's allotted time may be adaptively allocated.

Station-Originated Message

All Stations monitor the channel continuously and are able to hear INVITATION-TO-REQUEST messages usually from more than one Access-point. A Station may send a REQUEST (108) immediately following receiving an INVITATION-TO-REQUEST message (005) from the current Access-point as indicated in the last POLL received.

If the INVITATION messages from that Access-point are not heard within a specified interval (e.g. 10 milliseconds), as might be the case for a moving Station, the Station with a message waiting could use any Access-point with matching system identification (SYS).

The Station will receive a response that is either GRANT, ACK or NACK or nothing at all. If it is desirable to have a wait interval during which the Station may receive a GRANT (013), the infrastructure would reply with immediate ACK (009). The wait state would be appropriate for delays of up to two or three scan intervals so that the Access-point could GRANT on a following round or from a different Access-point.

If the response is NACK (011), the REQUEST would be repeated immediately. If there is no reply to the Station REQUEST, the REQUEST would be repeated after the next usable INVITATION-TO-REQUEST. It is possible for a REQUEST to be rejected because the infrastructure does not have the resources to process the message at the time of the REQUEST.

The GRANT message contains a power level setting (PWR) and the short address of the requesting Station. The Station sends the PACKET DATA FRAME (102) using the previously assigned power level and short address.

After the Packet data frame is sent, the originating Station waits for ACK (009) from the Access-point ending the cycle. The ACK and NACK from the Access-point do not contain the short address field though they could. A small saving in air-time of arguable value is available because at this stage it not possible for the Station to receive an ACK from any other source with correct values in the other fields.

If no ACK is received, the Station may repeat the cycle unless the message is part of a connection-type service. For virtual circuits, there is no ACK function since a delayed packet is a lost packet.

Non-receipt is unlikely, because the preceding REQUEST was received successfully and because the transmission will be processed at the Hub Controller if it is received on any Access-point.

Hub Controller Originated Message

For the Hub Controller to send a packet to a Station, the PACKET or SEGMENT DATA FRAME (003 or 001) is transmitted from the appropriate Access-point at the same time and place otherwise used for the INVITATION-TO-REQUEST message. This is heard by the addressed Station, and immediately following receipt, the Station sends ACK (112) or NACK (114), with source address included, or nothing. There is no ACK for packets used for virtual circuits or for broadcast messages.

The message transmitted could be from outside the network or from any station within the network.

Isochronous Services Considerations

A virtual circuit may be provided by transmitting the necessary bundle of PCM samples with timely delivery. E.g. a 64 Kbits/sec isochronous circuit requires that a bundle of 48 octets be delivered every 6 milliseconds. Late delivery is no delivery. Early delivery over a range of half the interval is within the elasticity of FIFO buffer memory.

To have bounded worst-case access delay, it is necessary to limit the maximum payload length of a packet. E.g. 288 octets of payload is enough for a virtual circuit of 384 Kbits/sec with 6 milliseconds transmission delay. 288 octets is the example choice for maximum payload size.

The transmission of full access cycles of the worst case message size for 15 Access-points would require 2,910 μsec, and this is the maximum possible access delay no matter what use is being made of the channel. This assumes that 15 Stations initiate the transfer of segmented packets in less than three milliseconds. Note: if the scan group is only four Access-points, there is a corresponding improvement in worst-case access delay.

At this level of demand, the Station with a new isochronous payload can get the channel or at least a message to the Hub Controller that there is priority traffic waiting. At the same time, there would be more than 2 milliseconds left in which to handle the priority isochronous traffic which is awaiting transfer.

Since each already setup duplex virtual circuit of 64 Kbits/sec would use about 94 μsec of channel time every 6 milliseconds, at least 16 such circuits could be supported in the remaining time.

Advantages of Asynchronous Sequential Operation

There is no place where a receiving Station must search for the right channel, code or time slot. The Station does not measure signal strength. There is only one channel, and the functions are entirely determined by the content of received and transmitted data messages.

The allocation of capacity is entirely determined in the infrastructure by the relative amount of channel time allowed for each service at each Access-point.

Changes or improvements in the system plan do not alter the logic of Station.

Available capacity can be partitioned between packet and isochronous services by administrative decision implemented as a configuration parameter. If less than the allocated isochronous capacity is used, all of the remaining capacity is used for packet communication. The packet capacity allocation can be reduced at the end of every packet handled.

Considering that in a group of 16 or fewer Access-points there is no possibility of avoiding interference from simultaneous use of many of the pairs of Access-points, the sequential use is non-interfering and can be made efficient.

The system behavior for high intensity demand for packet services is limited by the maximum packet length causing capacity division between simultaneously active users. Because there is an inherent queuing of demand against available capacity, the medium can be highly utilized after the dilution of overhead is absorbed.

Segmentation and Auto-GRANT

There must be a limit to the maximum length of one message, datagram or connection bundle. By using a low limit for datagrams, it is possible to allot a fraction of the capacity to each of several users or uses rather than block all subsequent users behind a long message transmission. This is a feature that may or may not be used for packet data, but it is essential to the guarantee that neither connection-type or packet traffic will block the other from receiving its guaranteed minimum portion of the transmission capacity.

With limited message length, it is necessary to segment the transmission of long packets and of connections. The procedure is that the setup is done once with full exchange of information, but thereafter segments are transmitted with only sufficient information attached for identification of the associated packet or connection.

The procedure for handling LAN packets longer than the protocol payload limit (e.g. 288 octets) is to divide the message into transmission segments of maximum length except for the last. A similar procedure is used for virtual connections where each bundle of samples is processed as a segment of a message of undefined length except for marking of the last segment.

The Hub Controller can automatically send GRANT without a REQUEST enabling transmission of segments with reduced overhead time.

REQUEST-GRANT Procedure for First Segment

There is no difference in the setup procedure for a complete message or the first segment of a long message. The format is identical for the PACKET DATA FRAME (003) and REQUEST (108/110) for either case. The difference is in the content of the LEN, SID and CNN fields.

For Access-point-orignated only, the first PACKET DATA FRAME transmitted for segmented messages is always long address format (003) since sufficient information (SID, LEN) is not provided by a preceding REQUEST message.

In the long address, there are 4-bits set aside for distinction between LAN and ISDN addressing, and for marking first, intermediate and last segments. The definitions used are determined by future public network practice for B-ISDN, SMDS and IEEE 802.6. Similar functions are independently defined for this access protocol by the SID field in the initiating transmission.

The LEN field at 13-bits can define lengths up to 8,191 octets which is larger than the length limits in most Standard LAN protocols. In the unlikely case that a greater length is needed, the count would be the remainder of a modulo 8192 division.

Auto-GRANT

A rule of the access protocol is that a Station may not transmit except after receiving a permission message from the Hub Controller. The Hub will know that a Station-requested service is a multi-segment LAN packet from the SID and LEN fields from which the number of segments required is obtained.

The first GRANT (013) is for the first segment only, however, with the auto-GRANT feature implemented, the Station does not need to make a new REQUEST to send the following segments. The Hub Controller, upon the start of availability of an Access-point preced the usual INVITATION-TO-REQUEST with a GRANT automatically for each following segment until the transfer is completed.

This function is not needed for Access-point originated messages. For transmission of segments to Stations, the Hub Controller knows when the appropriate Access-point and Station are available. The short or long address is used for the initial PACKET DATA FRAME and the short address only for following SEGMENT DATA FRAMEs.

The use of auto-GRANT materially decreases the overhead in providing service for connections and long packets.

Segment Data Frames

The SEGMENT DATA FRAME (001/100) uses a short address only. For Station-originated messages, it is sent following receipt of the GRANT (013) message containing the current values for API and PWR fields.

For Access-point originated long messages, the first transmission is a PACKET DATA FRAME (003) message, after which the SEGMENT DATA FRAMEs follow. There is no GRANT function required.

The SGN counter field of 6-bits is a continuing up-counter on the number of segments transmitted which is set to 0 the first time transmitted (For Access-point originate, the second data frame and the first segment; and for Station originate, the first data frame.). This counter provides a means for resequencing or detecting missing segments at the point where the complete message is reassembled. The value of SGN will not repeat for packets shorter than 18,000 octets.

2-bits of the SGN field are used for a status indication of intermediate or final segment in a long transfer.

It is necessary to have the CNN field in the segment header to identify the connection number because of the possibility of concurrent multiple connections at one Station. A Station may transfer only one packet at a time. If multiple sessions are maintained, it is not perceived in the physical layer.

Capacity Allocation and Packet/Connection-type Traffic Compatibility

Absolute allocation of capacity for carried traffic is possible, because the Hub controller determines which Stations may transmit and the carriability of offered traffic. The logic of the Station does not participate in this choice in anyway, except for the prioritizing of its own originated traffic.

Every system or plan has a limit to the amount of traffic that can be carried. Many efficient systems carry less rather than more traffic when the level of demand reaches a critical point. When both voice and data are carried, there must be a method for dividing capacity in a pre-planned way so that one does not impair or destroy the service for the other. This access protocol provides for the implementation of an adaptive or managed strategy for capacity division and handling of peak usage demands within the infrastructure and without requiring any concurrent changes in the user station.

Excess Demand from Stations

The Hub Controller will know the state of pending traffic for all of the Access-points it serves because the access method enables REQUEST to be received even if the requested service cannot be provided immediately. The Hub Controller can predict, using message length information, when backlogged Access-points will become available.

The first method of suspending new demands for service is by withholding the INVITATION-TO-REQUEST message, but this cannot be used because saturation of datagram and connection-type service capacity will rarely occur simultaneously.

INVITATION-TO-REQUEST will be issued normally, but after a REQUEST from a Station, GRANT may be withheld or ACK sent which orders the Station to wait. When there is excess demand, the queued messages stack up in the originating Stations and not in buffer memory in the Hub Controller. The determination of the state of that buffer memory is one of the criteria for sending the GRANT message.

Capacity Consumed by Virtual Connection Packets and Efficiency

If a digital circuit is 64 Kbits/sec, it may be reproduced by a payload bundle of 48 octets every 6 milliseconds. The amount of time used for a 64 Kbits/sec duplex connection on a 12 Mbits/sec transmission path, is the sum of the Station-originate time used by auto-GRANT+SDF (6+4+32+6+8= 56 μsec including propagation time) and Access-point-originate time used by the SDF (32+6+4=42 μsec) is required totaling 98 μseconds. 30 simultaneous 64 Kbits/sec connections would use 2,940 μseconds every 6 millisecond or about 50% of the channel capacity. With this level of traffic, each Access-point could provide an access opportunity every 3 milliseconds worst case.

The payload efficiency is 64/(64+34) or 65% considering the loss from propagation time and overhead, but not from added overhead during setup.

Priority Function for Virtual Circuits

Because of the limitation of the maximum length of one use, there is also a limit on the maximum waiting time before a new request for service can be entered. These new requests for service will be interspersed between data transfers whether or not they can be immediately served.

It is therefore possible for the Hub Controller to know what traffic is waiting even when it cannot be immediately transferred. This property is essential to a system handling both virtual circuits and packets, though this capability might not be needed for a system handling either alone. At high levels of usage, the length and duration of a proposed use is a factor in whether or not that use can be granted.

At each step, the Hub Controller must first handle inward and then outward connection-type messages ahead of datagrams because of the timely delivery requirement. The REQUEST messages includes the SID field which is used to indicate connection-type service required with it's relative priority, and the LEN field which is now used to indicate the interval between accumulated samples and the length of the accumulated sample payload. Since connection-type services may have more than one bandwidth and gathering interval, this information is essential to capacity allocation.

Segmentation for Virtual Connections

The segments of a virtual connection are treated as a segmented packet of indefinite length. The initiating message announces that it is a connection-type service both in the SID field and in the—long destination address, redundantly. The sampling dimensions are transmitted in the LEN field.

Each segment contains a marker that the segment is either intermediate or final in 2-bits of the SGN field.

The auto-GRANT initiation of the transmission of the next segment is the same for both circuits and packets.

Segmentation Compatibility with B-ISDN

The developing broadband ISDN standards for the public network are described in Bellcore Special Report SR-NWT-001763, Issue 1, December 1990. There, and other places, the Asynchronous Transfer Mode (ATM) plan to transmit either voice or data in cells with 48 octets of data and a 5 octet label is described. These cells may be passed at irregular intervals but at a constant average rate on a high speed medium.

This protocol, as described with its adaptive length packets and segments, can conform to the ATM payload size so that a second quantizing delay can be avoided at the boundary between an ATM based network and this wireless LAN. This flexibility would not be available with rigidly dimensioned time-slotting in the wireless LAN.

Autonomous Groups Without Use of Infrastructure

The defined scope for this plan includes the words "common channel" which means one time-shared radio channel for both up and down link at infrastructure Access-points. Common channel is used rather the common-place two-frequency duplex (one uplink and one downlink with repeater) so that portable computers can communicate with each other directly when no infrastructure is available. For this case, a further provision is made in the access protocol.

Without infrastructure and registration there is no rigorous method of assigning short addresses and the commonly-managed scheduling function is lost.

Two methods for operation without infrastructure dependence are now described.

Default Access Manager When No Infrastructure Is Present

The above described Access Protocol can include a default "access-manager" function in each Station. When turned ON, the Station listens for INVITATION-TO-REGISTER messages, and hearing none acts as a reduced function Access-point by sending INVITATION-TO-REQUEST and INVITATION-TO-REGISTER messages periodically, and by issuing GRANT in response to REQUESTs. A second station nearby can then register and communicate with the first station, and similarly for further added Stations.

The degree to which the default access-manager emulates a complete Hub Controller can vary without departing from the concept of the invention.

The default access manager can include a prompt for manual entry of a group number which is translated into a temporary System Number field to enable separation of overlapping coverage groups.

Modified Access Method for Direct Communication

It is possible to add function to the Station access protocol so that when infrastructure INVITATION-TO-REQUEST messages are absent, REQUEST messages may be generated spontaneously and without regard to whether there is signal present on the radio channel (as further described below). For Stations to be able to respond to an addressed REQUEST, the Stations must be able to transmit GRANT (013) and ACK (009) and NACK (011) messages in Access-point format, and to receive these messages with the DIR field coded "Station-originate" becoming 113, 109 and 111.

Stations with a packet to send transmit a REQUEST— long address. The addressee sends GRANT including the two least significant octets of the long address as short address, the originating Station sends the PACKET DATA FRAME using short addresses. If the two digits nominated appear to be duplicated, a random number is assigned by the granting Station.

If the packet is received with valid check bits, the addressed Station sends ACK. If the appropriate response is not received after any transmission, the originating Station restarts the procedure after a random value delay.

Absence of Signal/Carrier Detect Function

Many other systems use a carrier sensing test to determine that there is no signal present before allowing transmission. The effect in a radio system is frequent or total blocking of transmissions because signal can be detected from great distances or generated by non-linear effects from radio signals outside of the band in use.

The intent of the autonomous mode is to suit conditions when there is relatively small quantities of total traffic and low probability of overlapping transmissions. Since there is a "try again" logic, it is the strategy of this system that there is more to be lost in system capacity from false blocking than from interference of overlapping transmissions.

Advantages of Modified Access Method Autonomous Mode

The primary advantage is that there is no transmitter ON except when there is traffic to be passed. The regularly occurring transmission of INVITATION-TO-REGISTER/REQUEST and POLL messages from Access-points do not occur or occur with a much lower frequency.

Lower transmitter ON time is less power drain and less interference to other radio systems which do have peak activity at the same time.

This advantage could be obtained in a system with infrastructure when traffic quantity and the destinations addressed do not require the infrastructure to be active.

Dual Mode Systems (Infrastructure active/inactive)

It is possible for an infrastructure based system to "sleep" or remain in the background until some criteria for activity is met. Similarly, an active infrastructure can revert to a background mode when the criteria for activity are no longer met. In the background mode, the infrastructure could send INVITATION-TO-REGISTER and POLL messages at infrequent intervals (e.g. once every two minutes), but no INVITATION-TO-REQUEST messages.

The condition for transition to activity for the infrastructure would be any one of the following:
1) A REQUEST is addressed to a destination that cannot be reached except via the infrastructure, or a packet is received from an external source for a Station that is registered on the infrastructure.
2) An isochronous service is requested by or directed to a Station that is registered on the infrastructure.
3) The volume of traffic reaches a level where the use of air-time exceeds a pre-configured value (e.g. 2%).

2% use of air-time is about 80 messages per second of payload length 288 octets for the example medium of 12 Mbits/sec.

A typical system might have infrastructure active during the greater part of business hours but otherwise be in background mode. A different time pattern would be present in a hotel where large meetings were held, or in a Convention center.

Power Control Considerations

Power control is a critical problem in other systems with spread-spectrum channelization where the an Access-point communicates simultaneously with a number of Stations, but it is not required when the Access-point talks to one Station at a time.

In this system plan, minimization of the power is used by both Access-point and Stations to reduce cross-boundary interference between separate like-type wireless LAN systems. This plan allows all transmitters to be at full power all of the time, but interference losses will be lower if power is dynamically adjusted downward to the level necessary. To assist in this function, it is necessary for the Access-point receiver to measure and report the signal level of each received transmission. The report is used on REGISTRATION and POLL and subsequent transmissions from the Station to determine the preferred Access-point for passing messages to that Station and accommodating changes that may be required.

The Access-point transmit power can be dynamically controlled, usually downward, for subsequent messages to each Station. The choice of necessary transmitter power at the Access-point may be inferred from the received level by assuming path reciprocity or by logic control. It is usefule to have a PWR field in Station transmissions which report the power level at which the Station is currently transmitting.

Interference from Contiguous LANs

The access protocol has so far assumed a limited number of radio Access-points which are commonly controlled, and the effect of other contiguous like-type systems has been mostly ignored. There will be cases of inter-penetration of systems occurring in shopping malls, multi-tenant office buildings, adjacent office building, convention centers, public transportation terminals and many other places with a potential for causing lost messages from interference.

A mild consequence is that a Station in system A will hear and process transmissions from system B that can and will be ignored because the value of the SYS field is foreign. A more serious consequence is that the Station in system A will not hear transmissions addressed to it because of interference from a few nearby Stations in system B.

The inter-system interference possibilities for Access-points are more controllable and more easily estimated because the transmitters are stationary. The case now addressed is for Stations at random locations but near a boundary between systems.

Interference Probability Between Stations At The Boundaries

Because each station has an air-time duty cycle which is probably less than 0.056% (2.0 seconds/hour or 24.0 megabits of transmitted data per hour at 12 Mbits/sec), there is only one chance in 1800 that a particular interfering station will be transmitting. Similarly, while Station A listens all the time, there is only 0.056% of the time when the Station is listening to addressed traffic (approximation).

Only a few interfering Stations need be anticipated because there is a higher attenuation rate (vs. distance) between Stations than between Stations and Access-points, and because only a few (e.g. less than 20) are close enough to cause interference to a particular Station.

Without considering that there is any radio frequency isolation or that the desired signal from the Access-point might be stronger than the interference, the chances of the interfering transmitter being ON while there is relevant traffic being received at the interfered station is about $1$-in-$900^2$ considering overlap. If fewer than 1-in-1000 messages must be repeated because of interference, the system is hardly impaired.

Therefore: the event of a transmitting station originating interference to another receiving station in a different system is statistically improbable and well within the capacity of automatic repetition to correct. Automatic repetition of unacknowledged messages is a valuable and necessary feature of the system.

Use Of Directive Antennas To Improve System Operation

The Access-points can be separated with antenna directivity and placement, but this remedy is not available to individual stations. The improvements that can be obtained from directive antennas are not part of this invention, but it is important that the access protocol be sufficiently flexible to make use of these advantages.

Constructive Use of Redundant Radio Paths

This access method is based upon functions which are common to a number of ports for Access-points within the Hub controller. A further extension is the use of overlapping coverage from Access-points to provide the same advantages as selection-type, multiple-port space diversity (see W. C. Jakes, "Microwave Mobile Communications," John Wiley & Sons, Inc,; Copyright 1974 by Bell Telephone Laboratories; Chapter 5.2.1—Selection Diversity).

Station Transmissions

When a Station transmits, the message can be satisfactorily received at one or more Access-points and relayed to a common Hub Controller. There the message is decoded first determining that the copy is free of errors from the CRC field. The time of arrival of multiple copies will not vary by more than a few microseconds making necessary parallel receive processing for each port. The default choice is the registered port for that Station. Other copies would be sought only when the expected port has failed to produce a valid message. If any port has received a valid copy of an expected message, it is possible for the Hub Controller to process it appropriately.

This procedure is a subtle justification for limiting message length. Until the entire message is received, it is not known that it is an error-free copy, and many of the following steps depend upon that point.

Access-point Transmissions

It is possible to imagine four Access-points transmitting simultaneously to a four-channel receiver in the Station. If this were done, the redundancy would be beneficial in a small fraction of the cases, but the cost in spectrum and channel-time would be the redundancy factor. It is more efficient to invoke the redundancy only when needed.

Only if a first-transmission to a Station is unacknowledged does the matter of repeat transmission arise. Then the repeat may be provided on the same Access-point or on others. This choice depends on what is known in the Hub Controller common status directory.

This directory should know on which Access-points that Station was last received satisfactorily. These are the only candidates for use on a repeated transmission, and then they should be used in the order of decreasing signal level (as adjusted for maximum power transmission). An algorithm that could be implemented within this protocol would use the following sequence for transmitting to a Station that does not acknowledge:

Try 1) Send on the registered Access-point at programmed power.

Try 2) Send on the registered Access-point at maximum power.

Try 3) Send on the best alternate Access-point at maximum power.

Try 4) Send on second best alternate Access-point at maximum power.

Try 5) Send on the registered Access-point at maximum power.

Considering that a successful POLL will have passed through the Hub Controller and selected Access-point within the last fraction of a minute, it is unlikely that this full sequence would be necessary. Steps that are not valid would be omitted. If the first try was at full power and there was only one alternate Access-point, there would be three tries.

The transmission paths are not necessarily symmetrical. The power of the Station may be constrained by battery considerations to lower levels than at the Access-point. Redundancy is more needed for the Station transmissions than for those of the Access-point.

Central Management Functions

In a large scale wireless access system the possible use of one Access-point is in some way dependent on the status of the other Access-points around it.

It is a system requirement that the access protocol contain source records for all of the data noted below, and that the transfer of information from the point of generation to the point of use be provided.

Central management is implemented mainly in the Hub Controller, but the tasks involved require support from the access protocol.

The ability to deal with multiple address forms is also dependent on common function. The higher layer protocols are separate for connections and packets-only the physical medium and access to it are common.

Management of User Addressing, Status and Usage

A further management function is the status and directory records for all active stations with the following data:
1) Global LAN address (48 bits)
2) Local LAN address (16 bits)
3) Global E.164 address (60 bits)
4) Current Access-point identifier
5) Secondary and Tertiary Access-point identifiers
6) Current power setting
7) Last poll response time
8) Registration active/not active
9) Permitted address access These records may be stored for a selected configurable time interval (e.g. 4 weeks) following the last activity.

In addition, permanent records of usage by using Stations are needed, to cover charging and cost distribution and as evidence of system abnormality, with the following data:
1) Global LAN address (48 bits)
2) Global E.164 address (60 bits)
3) For each Access-point identifier used and by date-time
   a) Number of messages by direction
   b) Number of octets of payload transferred
   c) Number of failed transfers requiring repeat
   d) Number and time of registrations and de-registrations including API used Management of System Operations and Configuration A number of operational records should be kept and updated in real time. For each Access-point, the following records should be maintained:
1) Long and short Access-point identifier (API)
2) Location and antenna pattern description
3) Serving Hub Controller identifier
4) For contiguous API's status of each where reuse is either blocked or permitted for each API in the current group
5) API's and SYS no. of foreign systems received
6) Date of last service
7) Message handling data
   a) Number of packet messages-transmit, receive
   b) Number of packet octets of payload transferred
   c) Number of failed transfers requiring repeat
   d) Number of direct transfer messages
   e) Number of calls, messages and channel-seconds used for connection-type service For the system as a whole, data should be collected on the volume and character of out-of-network traffic.

There are also a number of configurable parameters which may require downloading of other than default values from a "human" system manager. Some of these are:
1) partitioning rules for data and voice capacity
2) authorized user identifications 3) access restrictions selectively by user
4) security screening data
5) operating dimensions for timeouts, lengths, rates, sizes, frequencies and other parameters Application to Headend Radio and Cable Repeater Systems Radio systems receiving on one frequency and retransmitting on a second frequency are common, and they are often called two-frequency shared repeaters. There are good and sufficient reasons for this type of operation.

For the purpose of this invention such systems are regarded as common or single channel systems, which do not have the possibility of direct Station to Station communication. In these systems only one transmitter at a time can use the uplink, and the received signal from the uplink is broadcast on the downlink.

It is possible to conceive a system of many two-frequency repeaters in which the same type of system operation is used. Use of separate up and down channels is within the scope of this invention.

The same consideration would apply to the connection of many Access-points to as many taps on a coaxial cable (e.g. common CATV (community antenna television) cables. Such cables carry up and down links on separate channels or in some cases in two cables.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An access method and protocol for a common channel wireless local area network, said access method comprising the steps of:

providing an access method utilizing a physical medium for the transmission of messages wherein all messages are accomplished by coding and content of a digital bit stream;

providing a fixed network infrastructure including a plurality of access points comprising antennae and radio, said access points including alternately used transmit and receive functions, and further including a hub controller connected to and sequentially controlling the transmit function in said access points by multiple electrical conductors bearing a baseband replica of the messages received and transmitted by the access points;

providing either or both fast-packet data and connection-type services from said access points to a plurality of stations to be served by wireless access;

transmitting sequential, asynchronously initiated messages that are not delayed from said access points which include either complete message sequences to said stations or invitation-to-transmit messages to enable initiation of transmission of messages from said stations when said infrastructure is available for message transfer;

receiving a request-to-use message from one or more requesting station in the plurality of said stations to any of said access points, said request-to-use message containing necessary information on the message transfer required by the requesting station;

transmitting a grant-to-use message conditioned upon resource availability from a preferred receiving access point from among the plurality of said access points to said requesting station; and receiving a limited length digital information packet transmitted from said requesting station to said preferred receiving access point immediately following receipt of said grant-to-use message.

2. The access method and protocol of claim 1 wherein said hub controller is further connected to a means for access to other networks.

3. The access method and protocol of claim 1 wherein said sequential, asynchronously initiated messages transmitted from said access points are demand-interleaved.

4. The access method and protocol of claim 1 wherein said limited length digital information packet transmitted from said requesting station to said preferred receiving access point includes a header associating the current transmission with said previously transmitted request-to-use message, and further includes a trailer.

5. The access method and protocol of claim 1 further including the step of:

transmitting an acknowledge message from said preferred receiving access point to said requesting station after receipt of said limited length digital information packet.

6. The access method and protocol of claim 5 further including the step of:

enabling a message originated by a first station to be addressed to a second station which is near enough to receive the message directly, where said hub controller delays transmission of said acknowledge message, and where said second station promptly sends an acknowledge message indicating successful direct receipt of the message and which inhibits said hub controller and the associated access point from acknowledging or repeating said directly received message.

7. The access method and protocol of claim 6 wherein said hub controller delays transmission of said acknowledge message only when said first and second stations are associated with the same or nearby access points.

8. The access method and protocol of claim 1 wherein the physical medium for the transmission of messages is on one radio channel.

9. The access method and protocol of claim 1 wherein the physical medium for the transmission of messages utilizes separate radio channels operated in tandem for up and down links used as a common channel.

10. The access method and protocol of claim 1 wherein the physical medium for the transmission of messages is provided by optical radiation.

11. The access method and protocol of claim 1 further including the step of:

enabling nearby stations to communicate with each other when said infrastructure is not present, where a first station, after monitoring the physical medium, determines that no infrastructure is active, and the access point and hub controller protocols are simulated by said first station including the transmission of invitation-to-transmit and grant-to-use messages by said first station.

12. The access method and protocol of claim 1 further including the step of:

enabling nearby stations to communicate with each other when said infrastructure is not used or not present, where all said stations that are active have monitored the physical medium and determined that no infrastructure is active, and switch to an autonomous mode, where a first station sends a request-to-use message upon need and without regard to activity on the physical medium, and where an addressed second station responds with a grant-to-use message, and where said first station then sends a complete data message, and where said second station sends an acknowledgment message upon receiving a correct data message.

13. The access method and protocol of claim 1 further including the step of:

limiting the length of messages, where messages of greater length are broken into segments for transmission, and where each segment header uses a temporary short address to identify the related source, destination and other information in the request-to-use message from said requesting station or in the header of the first segment transmitted to said stations from said access points.

14. The access method and protocol of claim 1 further including the step of:

enabling each station upon activation to listen to the physical medium for interleaved invitation-to-register messages, and immediately upon receipt a receiving station sends a registration message containing all necessary identification information, and from which said hub controller associates the particular access point from which a satisfactory signal is received with said station to determine routing for future messages addressed to said station.

15. The access method and protocol of claim 14 further including the step of:

enabling said hub controller to conduct a background addressed poll of all registered stations, and where the response of said stations to the poll is used by said hub controller to confirm or alter said access point identification with which each said station is associated.

16. The access method and protocol of claim 15 wherein the absence of response is used to initiate a search for a registered station from other access points or to de-register a station.

17. The access method and protocol of claim 1 further including the step of:

enabling a message from a first station to be delivered to a second station which is not near enough to receive the message directly, but which is served by an access point, where said hub controller, after receiving a correct copy of the message from said first station through an access point, sends an acknowledge message to said first station, and said hub controller then retransmits said message on the access point which is assigned to said second station, and said second station, upon receipt of a correct message, sends an acknowledge message back to said access point.

18. The access method and protocol of claim 1 further including the step of:

enabling repetition of a data message from said infrastructure to a station where said hub controller initially receives no acknowledge message, where said hub controller repeats the transmission of the data message stopping after an acknowledge message is received or a predetermined number of transmissions have been made.

19. The access method and protocol of claim 18 wherein such repeated transmissions are made from alternative access points also determined to have a transmission path to said station.

20. The access method and protocol of claim 1 further including the step of:

enabling repetition of a data message from a station to said infrastructure when such message is initiated following receipt of a grant-to-use message and where said station hears no acknowledge message or hears a not-acknowledge-repeat message, where said station repeats the transmission of the data message stopping after an acknowledge message is received or a predetermined maximum number of transmissions have been made.

21. The access method and protocol of claim 1 wherein said messages include the following meanings and function for those originating at the infrastructure:

a) PACKET or SEGMENT DATA FRAMES;
b) INVITATION-TO-REQUEST;
c) ACK (knowledge); and
d) GRANT (permission-to-use);

and for those originating at the station:

e) REQUEST (request-to-transmit-data-message);
f) ACK (knowledge); and
g) PACKET or SEGMENT DATA FRAMES.

22. The access method and protocol of claim 1 wherein said messages also include the following from the infrastructure:

a) INVITATION-TO-REGISTER;
b) POLL;
c) NACK-repeat (not-acknowledge);

and the following from the station:

d) REGISTER;
e) DE-REGISTER; and
f) NACK-repeat.

23. The access method and protocol of claim 1 further including the step of:

sequentially using the common channel at each of the available access points to transmit data messages to stations and then to receive an acknowledge message indicating the successful reception of the data message, and to transmit an invitation-to-request message, to receive a request message, to transmit a grant message, and then to receive data and to transmit an acknowledge message indicating successful reception of that data.

24. The access method and protocol of claim 1 further including the step of:

enabling an infrastructure access point to respond to a station requesting permission-to-use with one of the set of following messages:

an immediate permission-to-use;
an immediate acknowledge indicating the permission-to-use will be deferred;
a not-acknowledge message after which the station repeats the request; and
no message at all within a predefined time interval causing the station to return to its initial state.

* * * * *